United States Patent
Bezuidenhout

(10) Patent No.: US 7,392,435 B2
(45) Date of Patent: Jun. 24, 2008

(54) EMAIL GATEWAY DIAGNOSTIC TOOL, SYSTEM, AND METHOD

(75) Inventor: Reinier Bezuidenhout, Nashua, NH (US)

(73) Assignee: Nokia Inc., Irving, TX (US)

( * ) Notice: Subject to any disclaimer, the term of this patent is extended or adjusted under 35 U.S.C. 154(b) by 648 days.

(21) Appl. No.: 10/608,729

(22) Filed: Jun. 27, 2003

(65) Prior Publication Data

US 2004/0236999 A1    Nov. 25, 2004

Related U.S. Application Data

(60) Provisional application No. 60/469,204, filed on May 9, 2003.

(51) Int. Cl.
*G06F 11/00* (2006.01)
(52) U.S. Cl. .............................. 714/48; 714/46; 714/38; 709/224
(58) Field of Classification Search .................. 709/223, 709/224, 206; 714/4, 46, 38, 48; 370/242
See application file for complete search history.

(56) References Cited

U.S. PATENT DOCUMENTS

| | | | |
|---|---|---|---|
| 6,789,215 B1* | 9/2004 | Rupp et al. | 714/38 |
| 2003/0028825 A1 | 2/2003 | Hines | |
| 2004/0010584 A1* | 1/2004 | Peterson et al. | 709/224 |

FOREIGN PATENT DOCUMENTS

WO    WO 02/091088 A2    11/2002

* cited by examiner

*Primary Examiner*—Robert W Beausoliel, Jr.
*Assistant Examiner*—Philip Guyton
(74) *Attorney, Agent, or Firm*—Alston & Bird LLP

(57) ABSTRACT

An email gateway diagnostic, tool, system, and method are provided for automated troubleshooting of email gateway functionality. Troubleshooting can occur in multiple modes of operation including: full diagnostic, interactive, and undeliverable mail status information. Based upon a set of rules and conditional statements, network and email gateway configurations, and user responses, an automated troubleshooting tool performs necessary testing to the email and network systems to interpret the available information and present the user with the source of the problem or suggest solutions and make recommendations as to why the email gateway may not be functioning properly.

18 Claims, 15 Drawing Sheets

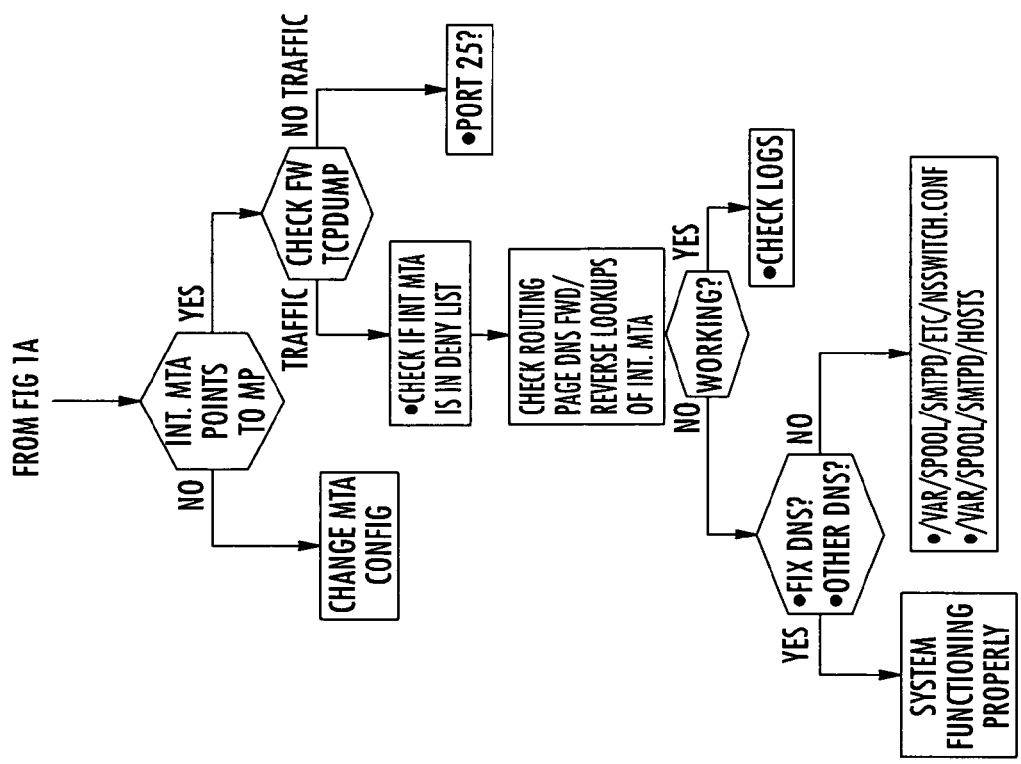
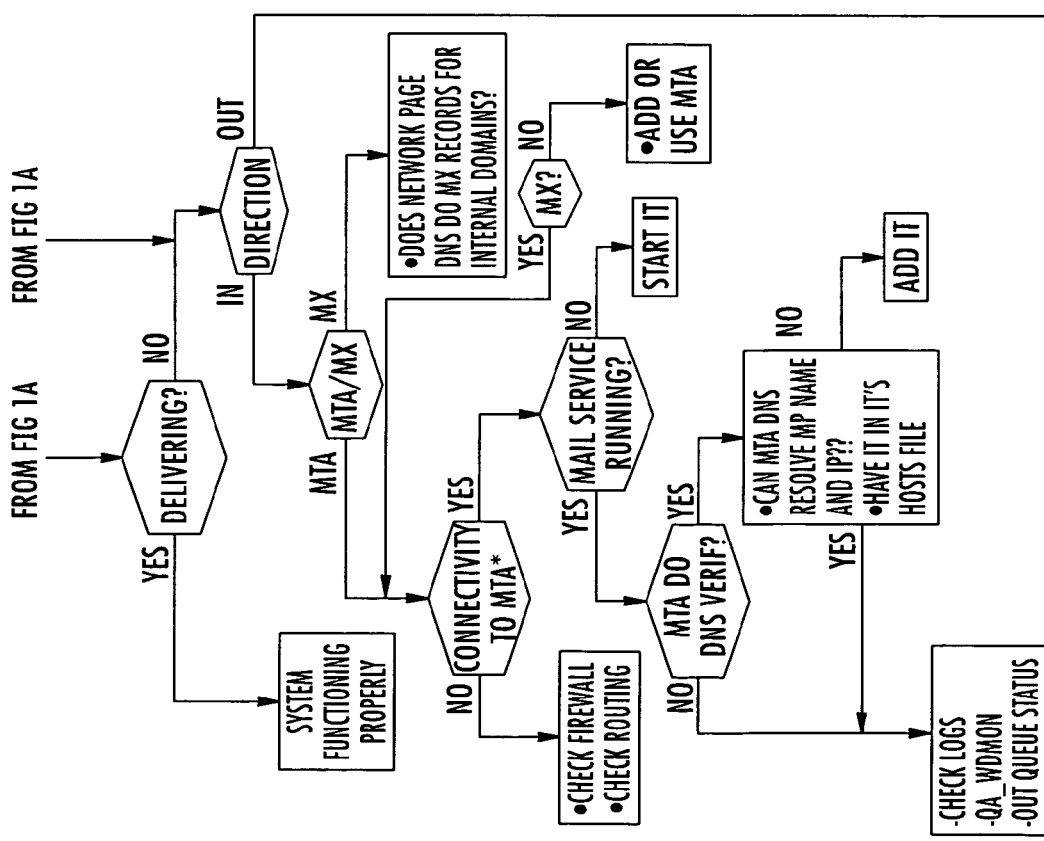
FIG. 1B

```
XTERM                                                    □ □ □

EXTRACTING RELEVANT INFORMATION...

GETTING INTERFACE INFORMATION...
0-FOUND ETH0 WITH IP : 140.15.140.12

FOUND 1 INTERFACES

SELECTING SINGLE INTERFACE AS WORLD IP
MP WORLD IP SET TO 140.15.140.12
─────────────────────────────────────────
NETWORKING PAGE DNS SERVER    : 140.15.140.10
ROUTING PAGE DNS SERVER       : 140.15.140.10
HOSTNAME                      : COMTAR
DOMAIN  NAME                  : COMAF.COM
DELIVRY                       : MTA
MTA_IP                        : 140.15.140.140
WORLD IP                      : 140.15.140.12
─────────────────────────────────────────

PLEASE ENTER ALL THE RELEVANT INFORMATION

1. DO FULL DIAGNOSTIC
2. DO STEP BY STEP DIAGNOSTIC
3. SCAN FILES IN OUT QUEUE

OPTION ? ■
```

FIG. 2

```
XTERM                                                    ☐ ☐ ☐
HOSTNAME        :COMSTAR
DOMAIN NAME     :COMAF.COM
DELIVERY        :MTA
MTA_IP          :140.15.140.140
WORLD IP        :140.15.140.14
```
--------------------------------------------------

PLEASE ENTER ALL THE RELEVANT INFORMATION

1. DO FULL DIAGNOSTIC
2. DO STEP BY STEP DIAGNOSTIC
3. SCAN FILES IN OUT QUEUE

OPTION ? 2

IS THE MP RECEIVING MAIL (Y/N)? N
STARTING MAIL RECEIT DEBUGGING....

IS THE PROBLEM WITH INBOUND OR OUTBOUND MAIL (IN/OUT) ? IN

TESTING INBOUND RECEIT SETUP...PLEASE WAIT

CHECKING STATUS OF SMTPD : OK

USING WORLD SITE WWW.NOKIA.COM...

STARTING FORWARD LOOKUP : FAILED

DOESN'T SEEM LIKE THE EXTERNAL DNS CAN RESOLVE NAMES...
RESOLVING WWW.NOKIA.COM FAILED!

THE MP MUST BE ABLE TO VERIFY INBOUND CONNECTION VIA DNS
LOOKUP. IF THIS IS NOT WORKING, MESSAGES WILL BE REJECTED

PLEASE VERIFY THAT THE EXTERNAL DNS IS WORKING PROPERLY AND
THAT IT CAN RESOLVE THESE NAMES
ROOT@COMTAR:/OPT/NMP/SBIN# ■

*FIG. 3*

```
XTERM                                              □ □ □
────────────────────────────────────────────────────────
PLEASE ENTER ALL THE RELEVANT INFORMATION

1. DO FULL DIAGNOSTIC
2. DO STEP BY STEP DIAGNOSTICE
3. SCAN FILES IN OUT QUEUE

OPTION ? 2

IS THE MP RECEIVING MAIL (Y/N)? N
STARTING MAIL RECEIT DEBUGGING ....

IS THE PROBLEM WITH INBOUND OR OUTBOUND MAIL (IN/OUT) ? OUT

TESTING OUTBOUND RECEIT SETUP ...
CHECKING STATUS OF SMTPD     : OK

PLEASE ENTER THE INTERNAL MAIL SERVER INFORMATION :
FULLY QUALIFIED DOMAIN NAME    : BEASTY.COMAF.COM
IP ADDRESS                     : 140.15.140.140

STARTING FORWARD LOOKUP     : OK
STARTING REVERSE LOOKUP     : OK
FORWARD AND REVERS LOOKUP SUCCESS ...

VERIFYING NAME MATCHES      : OK

DNS VERIFICATION IS WORKING PROPERLY ...

IF YOU STILL HAVE PROBLEMS, PLEASE LOOK INTO THE FOLLOWING
1. MAKE SURE THE SENDING MAIL CLIENT IS NOT IN THE DENY LIST
   ON THE MESSAGE REFUSAL PAGE
2. IF YOU HAVE RBL / RSS CHECKING ENABLED, DISABLE AND TRY AGAIN
3. CHECK YOUR FIREWALL CINFIGURATION
ROOT@COMTAR:/OPT/NMP/SBIN# ■
```

*FIG. 4*

```
XTERM                                                      □ □ □
DOMAIN NAME      :COMAF.COM
DELIVRY          :MTA
MTA_IP           :140.15.140.140
WORLD IP         :140.15.140.12
----------------------------------------------

PLEASE ENTER ALL THE RELEVANT INFORMATION

1. DO FULL DIAGNOSTIC
2. DO STEP BY STEP DIAGNOSTIC
3. SCAN FILES IN OUT QUEUE

OPTION ? 2

IS THE MP RECEIVING MAIL (Y/N)? Y

IS THE MP DELIVERING MAIL (Y/N)? N
STARTING MAIL DELIVERY DEBUGGING....

IS THE PROBLEM WITH INBOUND OR OUTBOUND MAIL (IN/OUT) ? IN

USING CONFIGURED MTA SETTINGS ...

CHECKING CONNECTIVITY WITH 140.15.140.140
        PROBE PORT 25              :OK

EVERYTHING SEEMS TO BE WORKING .. IF YOU ARE STILL HAVING PROBLEMS
DELIVERING MAIL TO YOUR INTERNAL SERVER, TRY THE FOLLOWING :

1. CHECK THAT THE INTERNAL MAIL SERVICE IS RUNNING ON THE SERVER
2. IF YOUR INTERNAL MAIL SERVER DOES DNS VERIFICATION, CHECK IF THE
   DNS SERVER THAT YOUR MAIL SERVER IS USING CAN RESOLVE THE NAME
   AND IP OF THE NOKIA MESSAGE PROTECTOR (FORWARD AND REVERSE LOOKUP)
ROOT@COMTAR:/OPT/NMP/SBIN# ■
```

*FIG. 5*

```
XTERM                                                              □ □ ▭
OPTION ? 2

IS THE MP RECEIVING MAIL (Y/N)? Y

IS THE MP DELIVERING MAIL (Y/N)? N
STARTING MAIL DELIVERY DEBUGGING....

IS THE PROBLEM WITH INBOUND OR OUTBOUND MAIL (IN/OUT) ? OUT

YOU HAVE MX RECORDS SELECTED FOR DELIVERY...

PLEASE ENTER THE DOMAIN YOU ARE SENDING MAIL TO IE. YAHOO.COM : YAHOO.COM

CHECKING MX RECORDS : OK
VERIFYING MX ENTRIES....
DOING LOOKUP FOR MX2.MAIL.YAHOO.COM. :
        IP = 64.157.4.78              : OK
        PROBE PORT 25                 : CONNECTION REFUSED

IP = 64.157.4.82              : OK
        PROBE PORT 25                 : CONNECTION REFUSED

IP = 64.156.215.5             : OK
        PROBE PORT 25                 : CONNECTION REFUSED

DOING LOOKUP FOR MX4.MAIL.YAHOO.COM. :
        IP = 66.218.86.253            : OK
        PROBE PORT 25                 : CONNECTION REFUSED

IP = 216.136.129.17           : OK
        PROBE PORT 25                 : CONNECTION REFUSED

IP = 216.136.129.5            : OK
        PROBE PORT 25                 : CONNECTION REFUSED

IP = 66.218.86.254            : OK
        PROBE PORT 25                 : CONNECTION REFUSED

DOING LOOKUP FOR MX1.MAIL.YAHOO.COM. :
        IP = 64.156.215.5             : OK
        PROBE PORT 25                 : CONNECTION REFUSED

IP = 64.156.215.6             : OK
        PROBE PORT 25                 : CONNECTION REFUSED

IP = 64.157.4.78              : OK
        PROBE PORT 25                 : CONNECTION REFUSED

ONE OR MORE OF THE SERVERS COULD NOT BE PROBED ON PORT 25.

MESSAGE PROTECTOR CAN'T REACH THE SERVER(S), AND THIS WILL CAUSE
MAIL DELIVERY TO FAIL TO THE DOMAIN YAHOO.COM
ROOT@REAR:/OPT/NMP/SBIN# ■
```

*FIG. 6*

```
XTERM                                                    ☐ ☐ ☐
HOSTNAME           : MAIL
DOMAIN NAME        : MAILMAIL.NOKIA.COM
DELIVRY            : MX
MTA_IP             :
WORLD IP           : 133.13.133.33
------------------------------------------------
PLEASE ENTER ALL THE RELEVANT INFORMATION

1. DO FULL DIAGNOSTIC
2. DO STEP BY STEP DIAGNOSTIC
3. SCAN FILES IN OUT QUEUE
OPTION ? 2

IS THE MP RECEIVING MAIL (Y/N)? Y

IS THE MP DELIVERING MAIL (Y/N)? N
STARTING MAIL DELIVERY DEBUGGING....

IS THE PROBLEM WITH INBOUND OR OUTBOUND MAIL (IN/OUT) ? OUT

YOU HAVE MX RECORDS SELECTED FOR DELIVERY...

PLEASE ENTER THE DOMAIN YOU ARE SENDING MAIL TO IE. YAHOO.COM : NOKIA.COM

CHECKING MX RECORDS              : OK
VERIFYING MX ENTRIES....
DOING LOOKUP FOR MAILH002.DEL.NOKIA.COM. :
        IP = 172.21.138.77       : OK
        PROBE PORT 25            : OK

DOING LOOKUP FOR MAILH003.DEL.NOKIA.COM. :
        IP = 172.21.138.82       : OK
        PROBE PORT 25            : OK

DOING LOOKUP FOR MAILH001.DEL.NOKIA.COM. :
        IP = 172.21.138.28       : OK
        PROBE PORT 25            : OK

CHECKING FORWARD AND REVERSE DNS ENTRIES FOR THE MP

USING EXTERNAL DNS SERVER 131.131.3.131 ...
STARTING FORWARD LOOKUP          : OK
STARTING REVERSE LOOKUP          : OK

EVERYTHING SEEMS TO BE WORKING .. IF YOU ARE STILL HAVING PROBLEMS
DELIVERING MAIL TO THE EXTERNAL MTA SERVER, TRY THE FOLLOWING :

1. IF YOU SUSPECT THE EXTERNAL MAIL SERVER DOES DNS VERIFICATION,
   CHECK IF THE EXTERNAL DNS SERVER FOR YOUR DOMAIN CAN RESOLVE THE NAME
   AND IP OF THE NOKIA MESSAGE PROTECTOR (FORWARD AND REVERSE LOOKUP)
ROOT@MAIN:/OPT/NMP/SBIN#■
```

FIG. 7

EMAIL GATEWAY DIAGNOSTIC TOOL, SYSTEM, AND METHOD

CROSS REFERENCE TO RELATED APPLICATION

This application claims priority to and the benefit of the filing date of provisional application entitled "Email Gateway Diagnostic Tool, System, and Method," assigned Ser. No. 60/469,204 and filed May 9, 2003, which is hereby incorporated by reference.

FIELD OF THE INVENTION

The present invention relates generally to email gateway diagnostics, and, more particularly, to automated diagnostic software tools, systems, and methods for setup and configuration of an email gateway.

BACKGROUND OF THE INVENTION

Network configuration is a complex and difficult task, often performed by skilled network administrators. This difficulty is compounded by each network differing from site to site and system to system.

Installation and configuration of an email gateway is a complex and difficult process. The specific configuration of an email gateway depends upon internal and external network configuration. Numerous factors impact proper functioning of an email gateway, including, the functioning of the network, the configuration of internal domain name servers (DNS or DNS server), the configuration of external DNS servers, the configuration and functioning of an internal mail transport agent (MTA), the configuration of firewalls, the network specific configuration such as network address translation (NAT), the state of the email gateway, and DNS verification failures.

Because networks are configured differently, there are many reasons why an email gateway may not be working properly. Any improper setting for an email gateway will likely impede full functionality of email communications. For example, if mail is not being received by the email gateway, it could be because the firewall is configured incorrectly, the mail exchange (MX) records of the DNS server are not pointing to the email gateway, or the email gateway is rejecting email because of DNS verification failures.

Presently for any problem that occurs with an email gateway, a user performs manual troubleshooting to determine the reason for the problem. Manual troubleshooting of email gateway functionality is a difficult and time consuming task that requires skill and knowledge of the email gateway, the network, and interoperability of the email gateway with the network and many individual network systems including DNS servers and firewalls. Manual troubleshooting of email gateway functionality is very network specific and usually must be done by hand from the system command line. Determining the exact reason why the email gateway is not functioning properly is the goal of troubleshooting and a difficult result to achieve. There are many unknowns and many settings to check. An improper setting may disable the entire email gateway, preventing a user from identifying the proper cause of the problem and distinguishing that cause from all other functioning network systems and properly configured settings. It is easy to miss checking a setting, make a mistake, or make an improper diagnosis during manual troubleshooting of the functionality of an email gateway.

BRIEF SUMMARY OF THE INVENTION

An email gateway diagnostic tool, system, and method are provided in the present invention for providing automated troubleshooting. The method of the invention can be implemented as a computer program or a set of computer programs that function together. For example, a tool, system, or method of the present invention can be part of a larger product such as the Nokia Message Protector. In one embodiment, a program representing the invention can be a user-executed script that executes system commands and interacts with the user. The method of the present invention can be used on different network environments to easily troubleshoot a specific installation or improper configuration and provide feedback and possible solutions to problems. For example, the method of the present invention can be used in a UNIX system or configured to run in a Windows® system.

A method, system, or tool of the present invention may have multiple modes of operation including: full diagnostic, interactive, and undeliverable mail status information. The full diagnostic mode performs all tests on the email gateway and network whether there is a reported problem or not. The interactive mode is a step-by-step process that queries the user for information about the problem to determine specific issues to troubleshoot. The undeliverable mail status information mode of operation provides the user with the status of the undeliverable mail in the outgoing queue.

In operation, a user may execute a computer application that embodies the diagnosis tool of the present invention to commence examination of the network system and email gateway. Depending upon the mode of operation, the tool automatically determines the configuration of the email gateway and certain network settings and systems. If necessary, the tool queries the user regarding the problem experienced with the email gateway and additional information that might be needed. Based upon a set of rules and conditional statements, network and email gateway configurations, and user responses, the tool performs various testing. The tool will interpret the information available and may present the user with the source of the problem or suggest solutions and make recommendations as to why the email gateway may not be functioning properly. For example, if the email gateway is not receiving email, the user may respond that the email gateway is not receiving email. The tool will check the DNS configuration and may recognize that the mail exchange records on the DNS server are not pointing to the email gateway for email delivery. The tool may present the user with this information and suggest the user make changes to the DNS configuration. If the email gateway is unable to deliver mail to one or more mail transport agents, the tool may query the DNS servers to determine where the mail should be delivered and probe the mail transport agents to check whether they are responding to mail delivery connections. If no problems are found, the tool may present the user with other possibilities to investigate that the tool may not be able to physically or technically test.

The method of the present invention can automatically perform at least the following functions: collection of the configuration of the network on which the email gateway is running including interface configuration, DNS configuration, and email delivery configuration; checking to see that all necessary applications to receive mail are running on the system; checking external DNS servers to see whether they are functioning properly; querying and retrieving external DNS mail exchange record configuration of required domains; using DNS record information to determine whether email DNS verification will function properly (DNS anti-spam configuration); querying and using DNS mail exchange record information to determine where email would be delivered when it is received; using email receipt information to probe the mail transport agents to see if they are accessible and functioning; and examining undeliverable emails and providing certain information regarding the undeliverable emails related to why they are not being delivered.

The skill and knowledge required for troubleshooting an email gateway installation and configuration are maintained by the tool and not required of the user. The tool has built-in intelligence and decision-making capabilities to automate the troubleshooting process. Because the user does not need to be confused or overwhelmed by the specific details of the troubleshooting, the tool only needs to present the resulting information or recommendations for consumption by the user. Thus, by using the email gateway diagnosis tool, system, or method of the present invention, a user can automatically troubleshoot a specific email gateway configuration without detailed knowledge of the components that make up the network, what network settings and systems to test, or how to communicate and test these network settings and systems.

BRIEF DESCRIPTION OF THE DRAWING(S)

Having thus described the invention in general terms, reference will now be made to the accompanying drawings, which are not necessarily drawn to scale, and wherein:

FIG. 2 shows an email gateway diagnostic tool requesting the mode of operation after collecting basic email gateway and network settings according to one embodiment of the present invention;

FIG. 3 shows an email gateway diagnostic tool performing an interactive, step-by-step operation where inbound email is not being received according to one embodiment of the present invention;

FIG. 4 shows an email gateway diagnostic tool performing an interactive, step-by-step operation where outbound email to a specific domain is not being received according to one embodiment of the present invention;

FIG. 5 shows an email gateway diagnostic tool performing an interactive, step-by-step operation where email is being received but inbound email is not being delivered according to one embodiment of the present invention;

FIG. 6 shows an email gateway diagnostic tool performing an interactive, step-by-step operation where email is being received but outbound email to a specific domain is not being delivered, and the tool finds a problem according to one embodiment of the present invention;

FIG. 7 shows an email gateway diagnostic tool performing an interactive, step-by-step operation where email is being received but outbound email to a specific domain is not being delivered, but the tool finds that everything it may check is working properly according to one embodiment of the present invention;

Figure 1A:
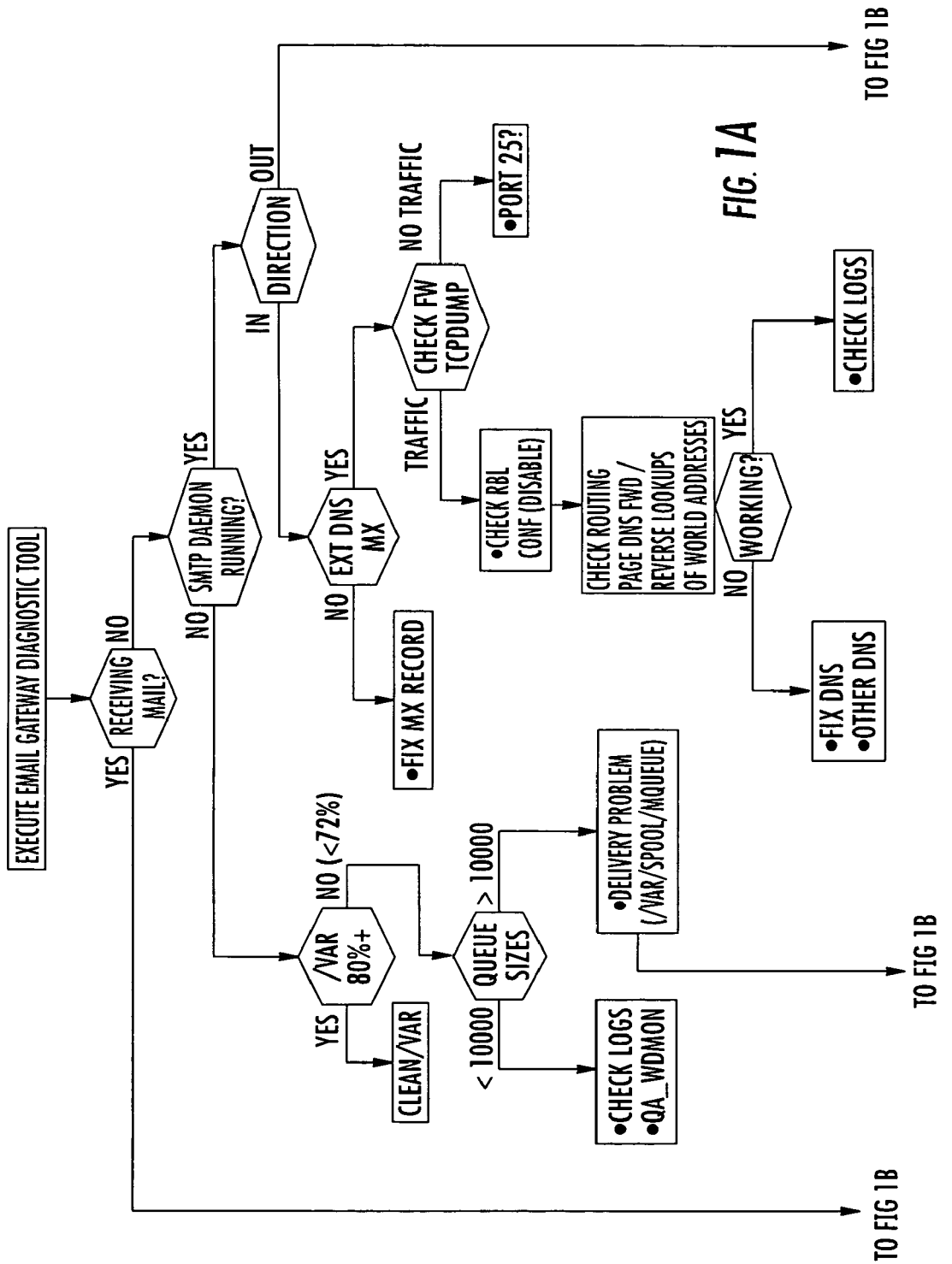
FIG. 1 is a flow chart of a set of instructions for an email gateway diagnostic tool, system, and method according to one embodiment of the present invention.
Figure 1C:
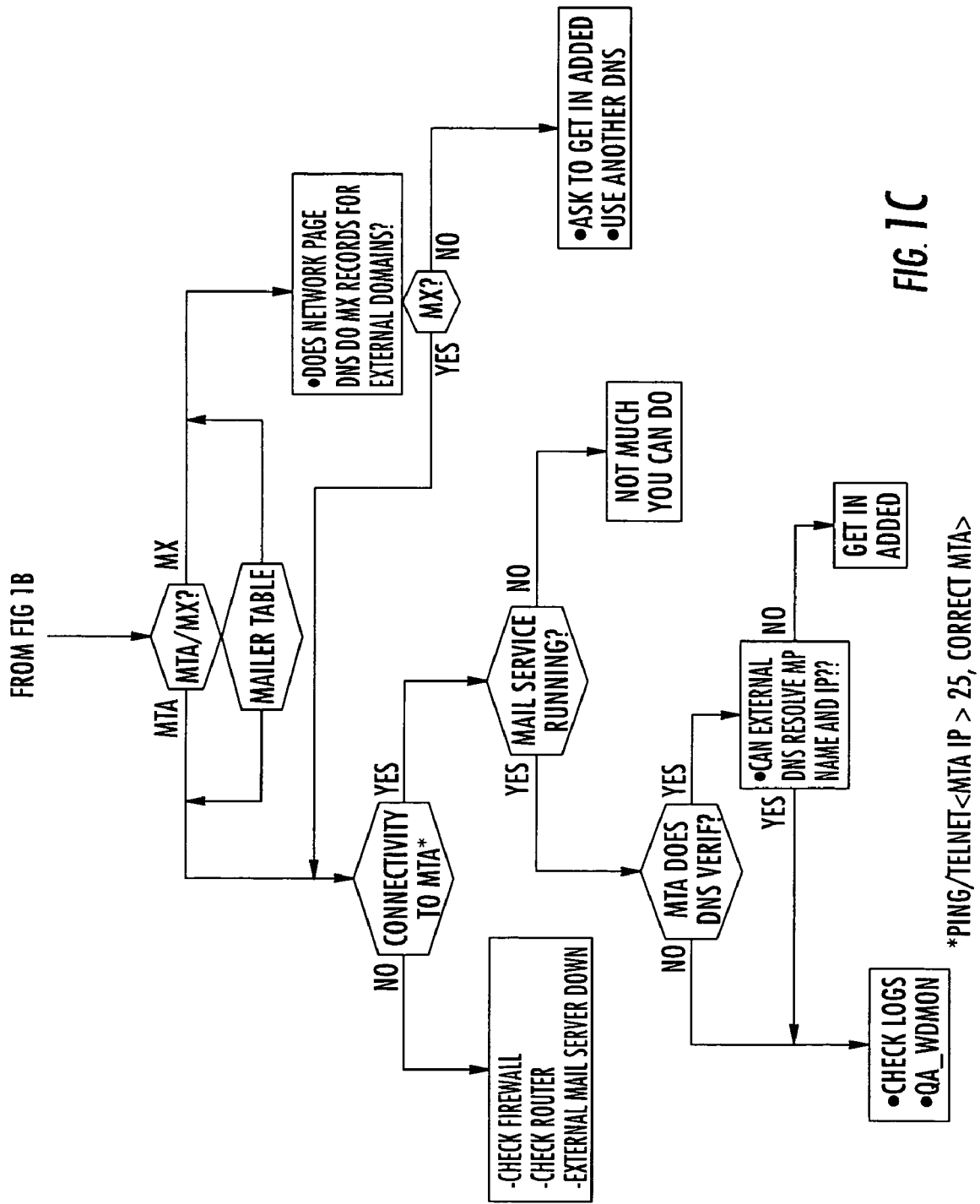
Figure 13:
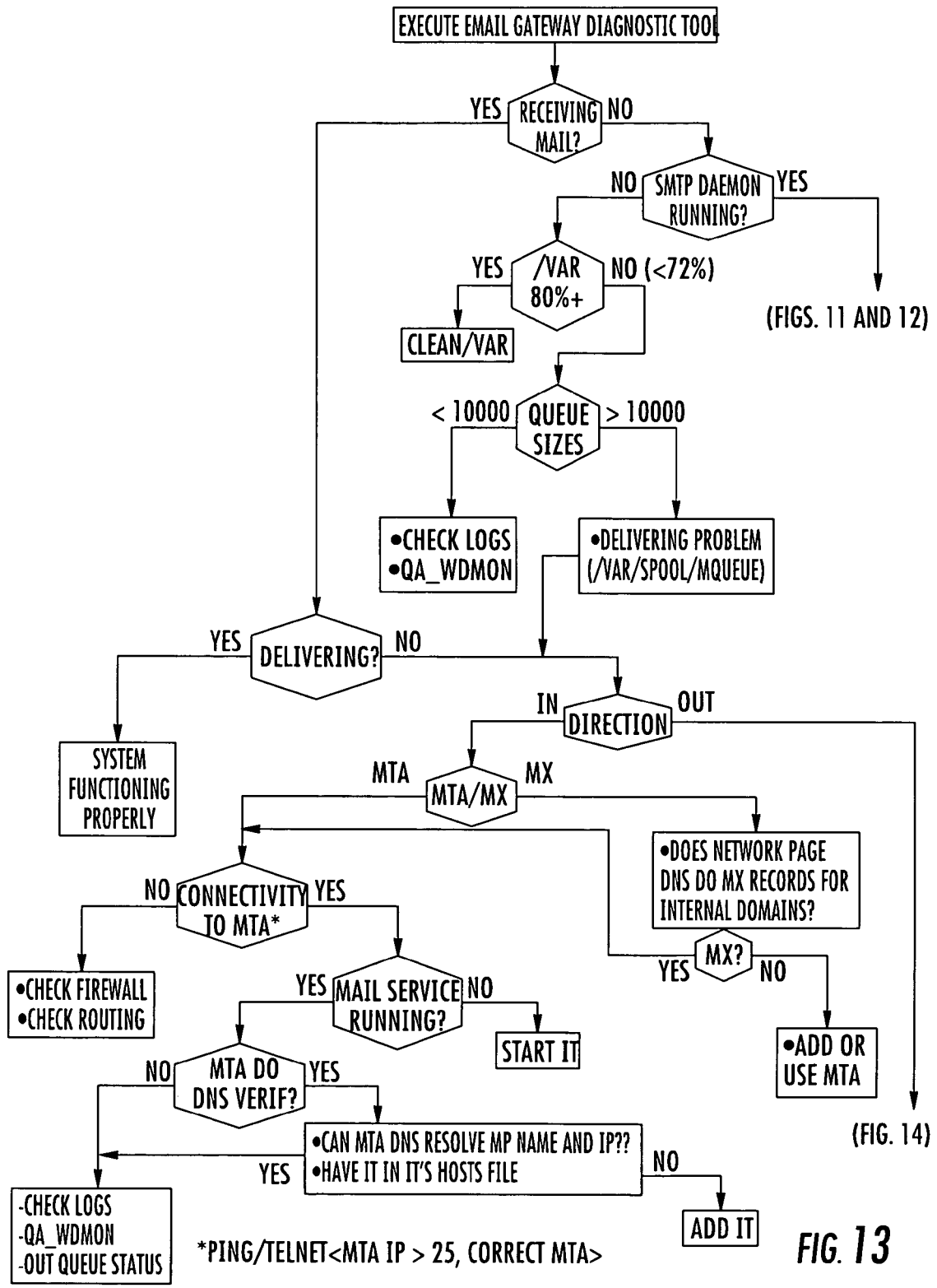
Figure 14:
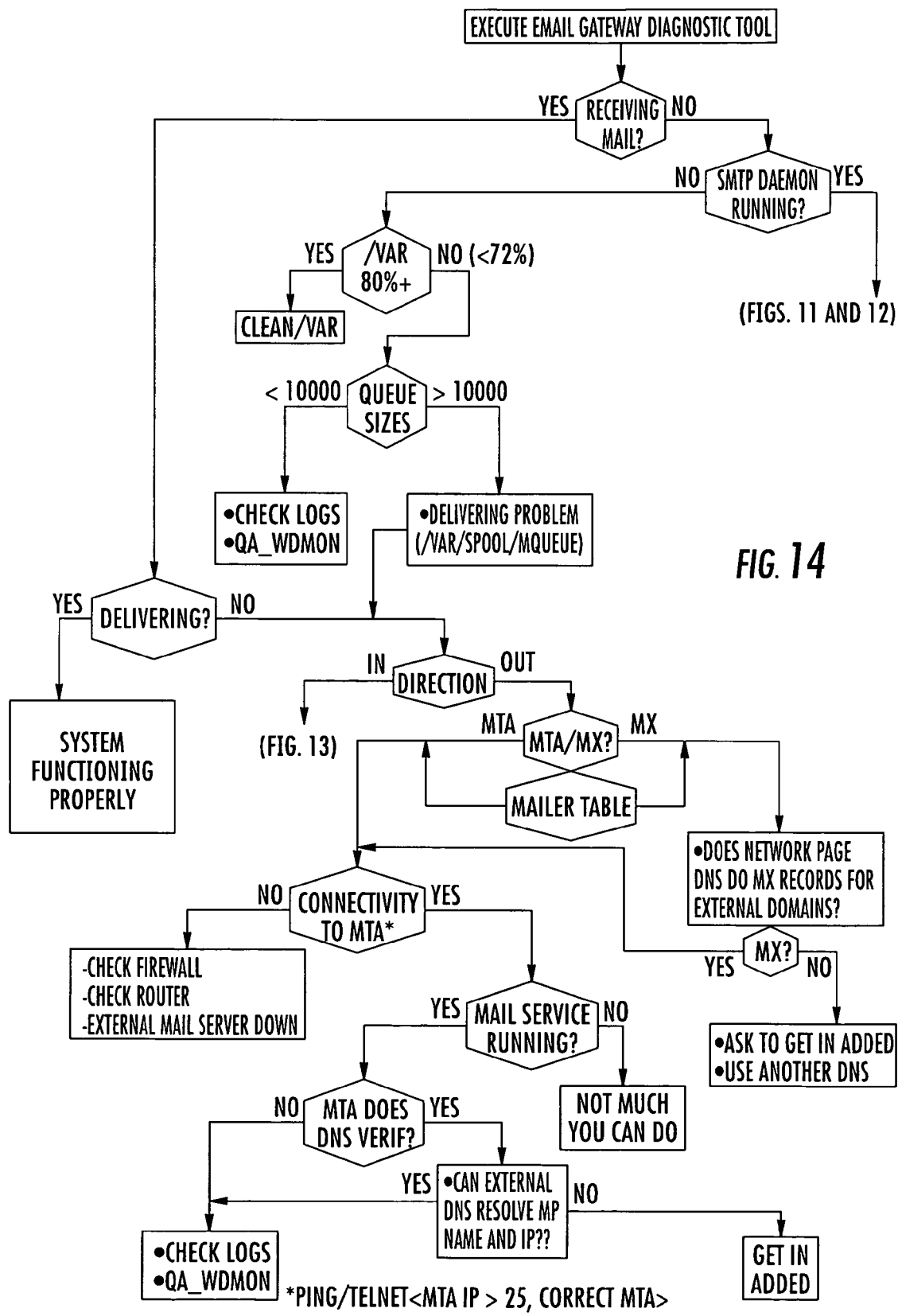

FIG. 13 is a portion of the flow chart of FIG. 1 where the email gateway is receiving but not delivering inbound email or the email gateway is not receiving email, the SMTP daemon is not running, and there is an inbound delivery problem; and FIG. 14 is a portion of the flow chart of FIG. 1 where the email gateway is receiving but not delivering outbound email or the email gateway is not receiving email, the SMTP daemon is not running, and there is an outbound delivery problem.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

An email gateway diagnostic tool, system, and method of one advantageous embodiment of the present invention generally include a set of instructions, rules and conditional statements, to perform the troubleshooting process. The rules and conditional statements of a tool, system, or method of one advantageous embodiment of the present invention can be embodied in a computer program or executable script for a computer. FIG. 1 is a flow chart of a set of instructions for an email gateway diagnostic tool, system, or method of one embodiment of the present invention. Specific examples of screen displays produced by the set of instructions in FIG. 1 are provided in FIGS. 2 through 7. However, an email gateway diagnostic tool, system, or method of the present invention can be embodied with other sets of instructions and with different flow logic including for example a subset of the flow logic in the embodiment of FIG. 1.

The method of the present invention can be employed in various modes including: full diagnostic, interactive, or step-by-step, and undeliverable mail status information. If the tool is used in either a full diagnostic or interactive mode, troubleshooting generally depends upon the responses provided by a user. For example, the tool needs to know whether or not the email gateway is receiving email. If the email gateway is receiving email and the tool is running in an interactive mode of operation, the tool may only perform the testing associated with troubleshooting an email gateway that is receiving email and not the testing that is uniquely associated with troubleshooting an email gateway that is not receiving email. If the tool is running in full diagnostic mode, the tool still depends upon the responses of the user to properly test each variable.

Figure 9:
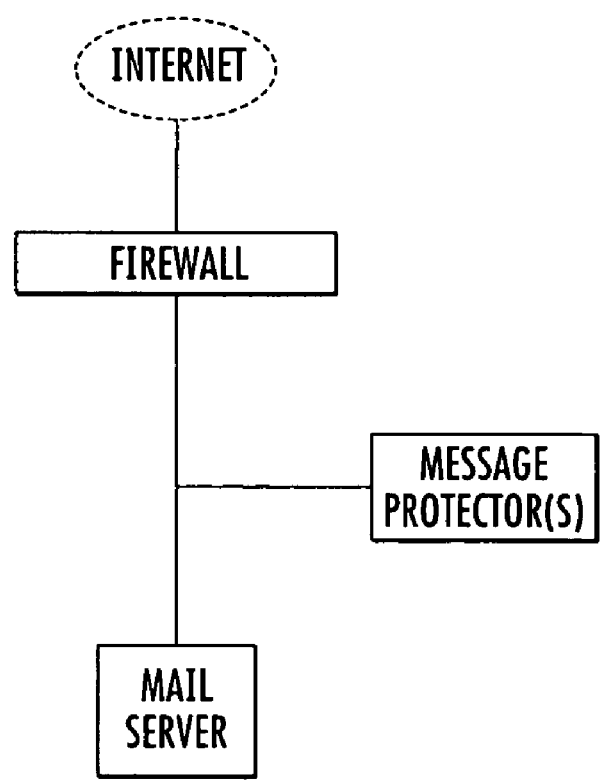
FIG. 9 shows a physical hardware arrangement upon which an email gateway diagnosis tool, system, or method of the present invention can be used.

By way of example, each of the routines and decisions of FIG. 1 is described hereinafter as a set of instructions for automatically troubleshooting email gateway functionality of a Nokia Message Protector. The Nokia Message Protector is an appliance that sits between a firewall and other mail servers, as shown in FIG. 9, and functions as an externally visible gateway mail transport agent. Although, the examples of FIGS. 1-7 are described in the context of the Nokia Message Protector, the email gateway tool, method, and system of the present invention can be used to troubleshoot email functionality of any email gateway including standard mail transport agents and email servers. When a user executes the tool, and after the tool acquires any basic network and email gateway setting information, the tool performs selected routines and testing depending upon the responses provided by a user. The beginning of this process is shown in FIG. 2. If the email gateway is receiving and delivering emails, then the email gateway should be functioning properly, and the tool will report this result to the user.

Figure 10:
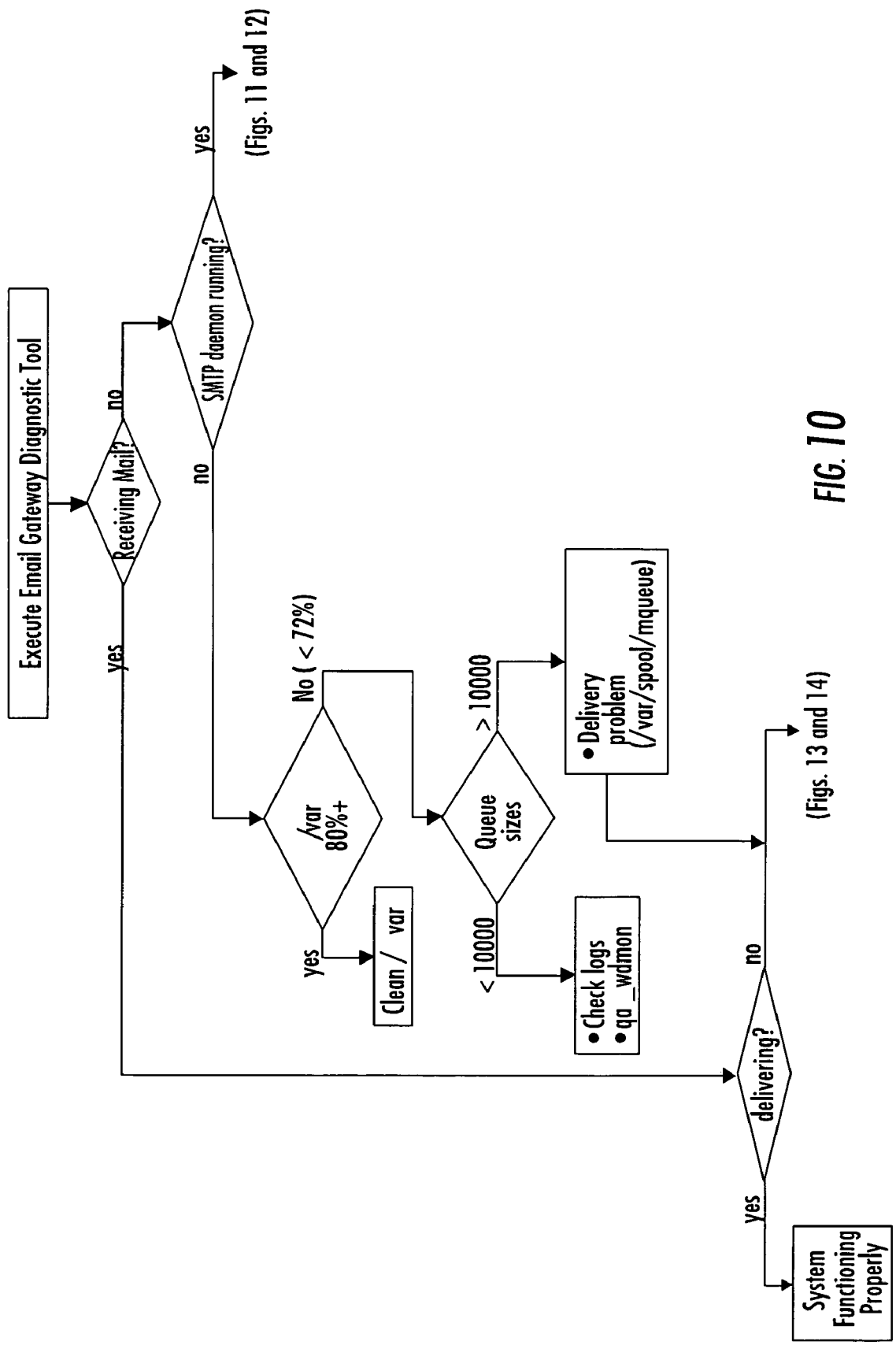
FIG. 10 is a portion of the flow chart of FIG. 1 where the email gateway is receiving email or the email gateway is not receiving email and the SMTP daemon is not running.

If the email gateway is not receiving email, the tool first checks to see if the SMTP daemon (smtpd) is running. The smtpd receives the emails in the Nokia Message Protector; thus, if the smtpd is not running, the email gateway will not be receiving emails. If the smtpd is not running, the tool checks to see why the smtpd may not be running. One embodiment of this routine of FIG. 1 is isolated in FIG. 10. In a particular application, if the /var partition on the hard drive is full, meaning more than a first predefined percentage of the storage capacity of the /var partition is full, such as more than 80% full, the smtpd may have been automatically shut down as a precautionary check by another application on the platform. Because part of the responsibility of the /var partition is to hold any quarantined emails, the /var partition can quickly reach this critical volume. If more than the first predefined percentage of the /var partition is full and the smtpd has been shut down, the tool will report that the smtpd is not running because the /var partition needs to be cleaned out so less than a second predefined percentage of the /var partition is full. The second predefined percentage may be set to be the same as, but typically is, less than the first predefined percentage so the smtpd is not easily shut down and re-enabled if the volume of the /var partition fluctuates back and forth around 80%, thus, causing the smtpd to be repeatedly turned off and on. In a particular application, if the smtpd has been shut down because the /var partition reached 80% full, the smtpd may not be re-enabled until the /var partition is less than 72% full. The second predefined percentage is chosen so the smtpd is not easily shut down and re-enabled if the volume of the /var partition fluctuates back and forth around a single percentage causing the smtpd to be repeatedly turned off and on. For a mail transport agent that does not include equivalent /var partition percentage limits, the tool will find the equivalent smtpd feature on the mail transport agent and continue to follow that decision path.

If the smtpd has not been shut down because more than the first predefined percentage of the /var partition is full, or the /var partition has been cleaned so that less than the second predefined percentage is full, then the tool will check the number of emails in the queues. If a queue has less than a predefined number of emails, such as less than 10,000 emails, the tool will suggest that the user check the logs for any errors and use the QA Watchdog Monitor (qa_wdom) to check the health of the email system. The QA Watchdog Monitor refers to a separate application designed to provide a system status of a mail transport agent or mail server and used with the Nokia Message Protector. Comparable applications can be created and used to provide a system status of mail transport agents or mail servers used with other mail transport agents. If a queue has more than a predefined number of emails, such as more than 10,000 emails, there is a delivery problem, and the tool will run the standard delivery troubleshooting routine, discussed later. For a mail transport agent without queue size limitations, the tool will find no delivery problem and may recommend to the user to check the logs and run any available system monitoring programs.

Figure 11:
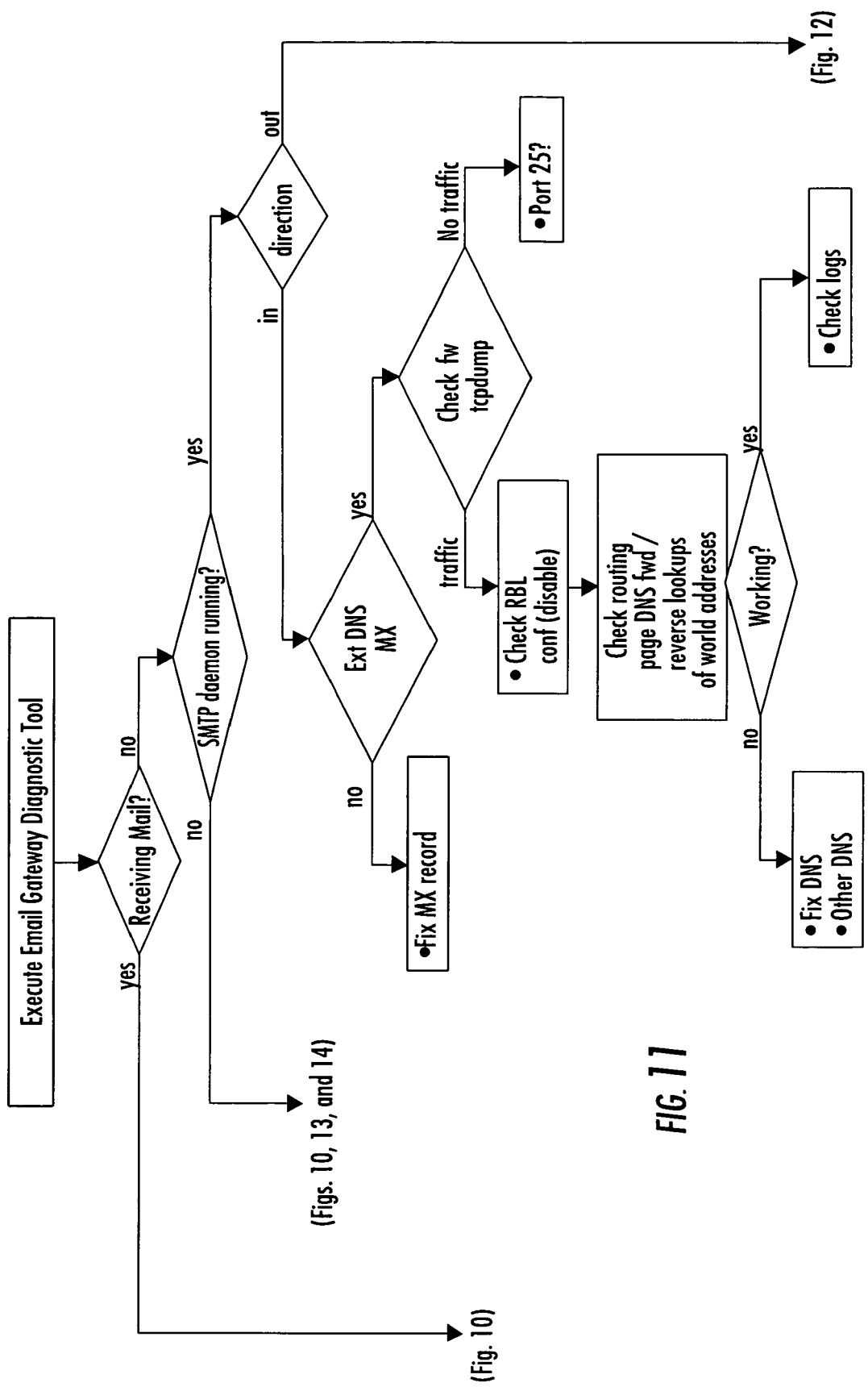
FIG. 11 is a portion of the flow chart of FIG. 1 where the email gateway is not receiving inbound email and the SMTP daemon is running.

If the email gateway is not receiving email, but the smtpd is running, the tool will query the user for the direction of the email that is not being received, whether it is email that is inbound or outbound, or both. This distinction is relevant because some mail transport agents, such as the Nokia Message Protector, will receive and scan both types of email. If the user responds that the email not being received is inbound email, the tool generally tests the external DNS server to see if it has been configured properly, as shown in FIG. 3. One embodiment of this routine of FIG. 1 is isolated in FIG. 11. If the external DNS server does not have a mail exchange record for the internal domain(s) of the entity supported by the email server, the tool will inform the user that the external DNS server's mail exchange records for the internal domain need to be fixed so messages can be delivered to the Message Protector.

If the mail exchange record on the external DNS server is correct, the tool will check the firewall to see if there is a faulty rule in the firewall that is preventing the network packets from getting to the mail transport agent. In one embodiment, the tool checks the firewall using tcpdump, the UNIX network sniffer and analyzer equivalent of WinDump for the Windows® platform, that will show the network packets. As with many of the specific commands and terms referred to in the particular examples of FIGS. 1-7, the tool, method, and system of the present invention can be used with equivalent commands on other platforms and with equivalent hardware devices. If there is no network traffic during the tcpdump on port 25 of the illustrated embodiment, the tool may report that there is something wrong with the firewall that the user needs to check and fix. While port 25 is an industry default port, the tool, method, and system of the present invention can be designed to function with any port; however, for simplicity, port 25 is used herein throughout.

If there is network traffic on port 25 during the tcpdump such that network packets are getting to the Message Protector, the tool will check to see if there is a real-time blackhole list (RBL). A real-time blackhole list is a type of DNS look-up table that includes known spammers and is used to block these known spammers that otherwise send spam email and relays to a third party by using this email service. The tool may check the real-time blackhole list configuration to see if it needs to be disabled before proceeding. If there is no real-time blackhole list or the real-time blackhole list is disabled, the tool uses the routing page DNS server to make sure the machine that is connecting to the Message Protector and trying to send it email has both a forward and reverse DNS look-up entry, an A record and the Pointer record (PTR record). If there is not both a forward and reverse DNS entry, the Message Protector will not accept mail from the server because it is an unknown server and the email could be from someone trying to send spam email. Conversely, all valid email services have a valid forward and reverse DNS entry. If the DNS verification fails, then the tool indicates that the user needs to get the DNS fixed by adding the forward and reverse DNS entries. If that is physically not possible, it may be necessary to use another DNS server that does have forward and reverse DNS entries. If the sending mail server or machine has both forward and reverse DNS entries, the tool of this embodiment will indicate to the user to check the logs on the platform for errors that could indicate why the email gateway is not receiving emails.

Figure 12:
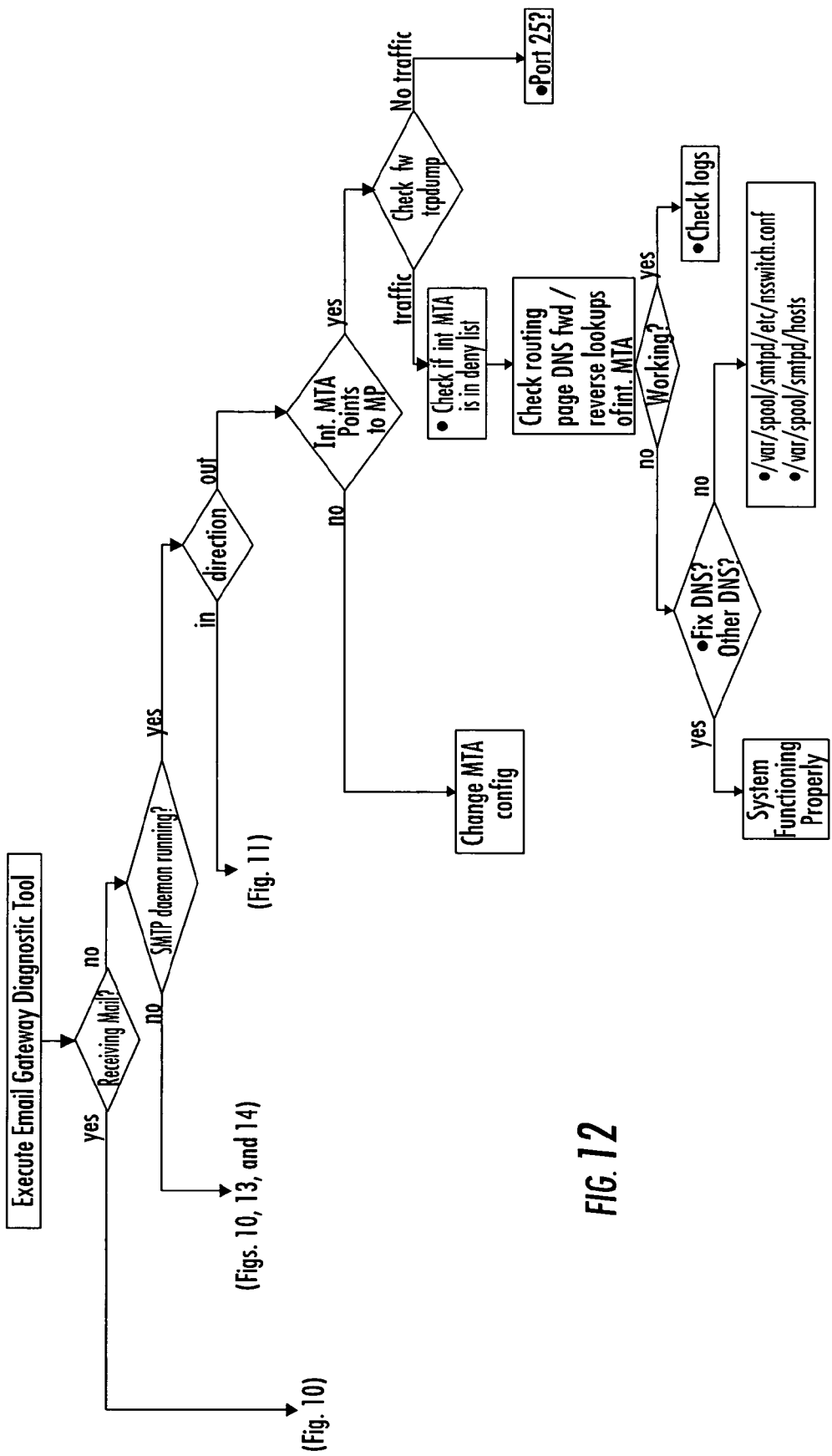
FIG. 12 is a portion of the flow chart of FIG. 1 where the email gateway is not receiving outbound email and the SMTP daemon is running.

If the email gateway is not receiving email, the smtpd is running, and the user responds that outbound email is not being received by the Message Protector, the tool of this embodiment will check the internal mail transport agent, internal message exchange server, or mail service, to see that it is configured to points all outgoing email to the Message Protector. One embodiment of this routine of FIG. 1 is isolated in FIG. 12. If the mail transfer agent is not configured to point the outgoing emails to the Message Protector, the email gateway will not receive emails, and the tool will report to the user to change the mail transport agent configuration.

If the mail transport agent is pointing outbound email to the Message Protector, the tool will check the firewall, much like it did for inbound email that is not being received, as shown in FIG. 4. The tool checks for network traffic through the firewall, and if there is no network traffic arriving at the mail transport agent or Nokia Message Protector, the tool may inform the user to change the firewall settings to allow network traffic for receiving emails.

If the firewall is passing the required network traffic, the tool of this embodiment will check the internal mail transport agent for a deny list that blocks mail from specific mail servers. The tool of this embodiment checks to make sure that the internal mail service has not accidentally been included in the deny list. If that is not the case, the tool will check the routing page DNS server for forward and reverse DNS look-up entries for the internal mail server. If there are forward and reverse look-up entries for the internal mail server, the tool will notify the user to check the logs for errors. If the routing page DNS does not contain forward and reverse DNS entries for the internal mail server, the tool of this embodiment will instruct the user that the DNS server can be fixed or another DNS server can be used. Or the user can modify the /var/spool/smtpd/etc/nsswitch.conf or /var/spool/smtpd/hosts files on the Message Protector to cause the Message Protector to first look in these modified files to find forward and reverse look-up entries instead of looking at the name and IP address on the DNS server, essentially side stepping the DNS server if the user cannot fix it or use another DNS server. If a matching entry is found, the Message Protector will accept the email. If the user can fix the DNS server or use another DNS server, the email systems should function properly.

If the email gateway is receiving email but not delivering email or the email gateway is not receiving email, the smptd is not functioning, the /var partition is less than a first predefined percentage full, such as 80% full, or the /var partition has been reduced to below a second predefined percentage full, such as 72%, after having been automatically shut down, and the queue has more than a predefined number of emails, such as 10,000 emails, waiting to be delivered, the tool of this embodiment will troubleshoot email delivery. The troubleshooting process and the checks that will be performed are dependent upon whether the email not being delivered is inbound or outbound as indicated by the user. If the email not being delivered is inbound, the tool will generally check the state of the Message Protector to see if the system has a mail transport agent or mail exchange records selected for delivery. If a mail transport agent is selected for delivery, all emails are forwarded to a specific machine regardless of where the DNS server indicates to send the email. If mail exchange records are selected, the Message Protector will query the DNS server that indicates to which machine to send an email from a particular domain. If mail exchange records are enabled, the tool will check whether there are mail exchange records for the internal domain. The tool will query the user for the destination domain of the email. Using this domain, the tool will query the DNS server to see if there is a mail exchange record entry in the DNS server for the domain. If there is no mail exchange record, the tool of this embodiment will tell the user to add a mail exchange record for the domain or use a mail transport agent delivery method. If there is a mail exchange record, the tool will perform the same check as if mail transport agent delivery is enabled.

For both mail transport agent and functioning mail exchange delivery, the tool of this embodiment will check for connectivity to the mail transport agent, such as the Nokia Message Protector, either by the mail transport agent configuration or the mail exchange record. To check for connectivity, the tool will typically probe port 25 and see if port 25 is registered to accept the email. If the port is not enabled to accept email, as in FIG. 5, the tool will tell the user to check the firewall and routing on the network because the tool is not able to contact the mail server. If the tool is able to contact the mail server, the tool informs the user that checks need to be performed to see if the mail service is running correctly. For example, if a mail exchange server is being used, there may be rules that will block mail from coming from a Message Protector. If the mail service is not running, the mail service needs to be started. If the mail service is running and the tool was able to connect to the mail server, the tool will suggest to the user to check if the mail server is doing reverse DNS verification. If the machine does reverse DNS verification and there is no DNS entry for the Message Protector, the mail server will reject mail coming from the Message Protector. If the mail transport agent does DNS verification, the tool will look up the Message Protector name and IP address in the DNS server and attempt to match them up. If the tool is unable to properly match the Message Protector name and IP address in the DNS server, the tool of this embodiment will instruct the user to add the Message Protector name and IP address to the DNS server.

If the mail transport agent does not perform DNS verification or if the mail transport agent is able to resolve the Message Protector name and IP address in the mail server host file such that a proper match is made, the tool of this embodiment will instruct the user to check the logs for errors, use a monitor program, such as the qa_wdmon, to check the health of the system, and/or run the tool to check the status of undeliverable mail in the out queue.

If the email gateway is receiving outbound email but not delivering outbound email or the email gateway is not receiving outbound email, the smptd is not functioning, the /var partition is less than a first predefined percentage full, such as 80% full, or the /var partition has been reduced to below a second predefined percentage full, such as 72%, after having been automatically shut down, and the queue has more than a predefined number of emails, such as 10,000 emails, waiting to be delivered, the tool of this embodiment will troubleshoot outbound email delivery. Again, the tool will check the configuration of the system to determine whether mail transport agent or mail exchange record delivery is enabled. If the system has mail exchange record delivery enabled, as in FIG. 6, the tool of this embodiment checks to see if the network page DNS provides mail exchange records for external domains. The tool will generally query the user as to what domain the email is being sent. The tool will query the DNS server for all the mail servers of the domain entered by the user. If the mail exchange records are enabled, and the tool cannot find entries for the mail servers of the domain entered by the user, the tool will indicate to the user to add these entries into the DNS server or use another DNS server.

If the tool finds mail exchange records for the mail servers of the domain entered by the user, the tool of this embodiment will perform the same troubleshooting as for mail transport agent delivery. For either scenario, the tool will typically check for connectivity to the machine by probing port 25 to see if port 25 is registered to accept email. If there is no connectivity to port 25, the tool indicates to the user to check firewall settings, to check the router to see if the network routing is wrong, and that the external mail server could be down.

If the tool determines that there is connectivity on port 25, as in FIG. 7, the tool of this embodiment will determine whether the mail service is actually running. If when the tool connects to port 25 there is no information coming back, the tool typically indicates to the user that there is connectivity to the external mail service but that the external mail server is not functioning properly.

If the tool determines that there is connectivity and that the mail service is running, the tool generally checks to see if the external DNS or mail transport agent is doing DNS verification. If the mail transport agent does DNS verification, the tool will check to see if the external DNS can resolve the Message Protector name and IP address. If the external DNS server cannot resolve the Message Protector name and IP address, the tool will instruct the user to get the Message Protector added to the external DNS servers.

If the mail transport agent does not perform DNS verification or the mail transport agent does DNS verification but the external DNS server was able to resolve the name and IP address of the Message Protector, the tool typically indicates to the user to check logs and use a monitor program, such as the qa_wdmon, to check the health of the system.

When checking for mail transport agent or mail exchange record delivery for inbound or outbound email, the tool could alternatively identify that the system is using a static routing mailer table. The mailer table can be configured to function like a mail transport agent or mail exchange record delivery. Thus, the mailer table is an alternative delivery method that the tool generally recognizes. If the mailer table is configured to function by mail transport agent delivery, the tool of this embodiment troubleshoots delivery as if the system is configured with mail transport agent delivery. If the mailer table is configured to function by mail exchange record delivery, the tool of this embodiment troubleshoots delivery as if the system is configured with mail exchange record delivery. The mailer table configuration works like a network routing table. The user can specify MTA or MX record delivery per domain. The tool will recognize these configurations and act accordingly to test the mail delivery.

FIGS. 2 through 7 are examples of several displays presented by an email gateway diagnostic tool performing various different troubleshooting routines. FIG. 2 shows an email gateway diagnostic tool of one embodiment of the present invention requesting the mode of operation after collecting basic email gateway and network settings. The user can see what information the tool has collected but does not see how the tool has collected the information. FIG. 3 shows an email gateway diagnostic tool of one embodiment of the present invention performing an interactive, step-by-step operation where inbound email is not being received. After the user selects the mode of operation to be interactive, the tool asks the user whether the email gateway is receiving email or not and whether the email is inbound or outbound, information the tool needs to select what troubleshooting routines need to be performed. The tool shows that it has checked the smtpd and that the smptd is running properly. The tool then checks DNS forward lookup. Based upon a failed forward DNS lookup, the tool makes recommendations and suggestions to the user. FIG. 4 shows an email gateway diagnostic tool of one embodiment of the present invention performing an interactive, step-by-step operation where outbound email to a specific domain is not being received. The tool performs a similar troubleshooting routine to that shown in FIG. 3. However, in FIG. 4, because the problem is with outgoing mail, the tool uses the outgoing mail domain provided by the user for its checks. FIG. 5 shows an email gateway diagnostic tool of one embodiment of the present invention performing an interactive, step-by-step operation where email is being received but inbound email is not being delivered. Here the tool performs different troubleshooting routines from FIGS. 3 and 4, but the tool checks the necessary configurations and settings for the problem described by the user in response to the questions presented by the tool. FIG. 6 shows an email gateway diagnostic tool of one embodiment of the present invention performing an interactive, step-by-step operation where email is being received but outbound email to a specific domain is not being delivered, and the tool finds a problem. FIG. 7 shows an email gateway diagnostic tool performing an interactive, step-by-step operation where email is being received but outbound email to a specific domain is not being delivered, but the tool finds that everything it can check is working properly.

Figure 8:
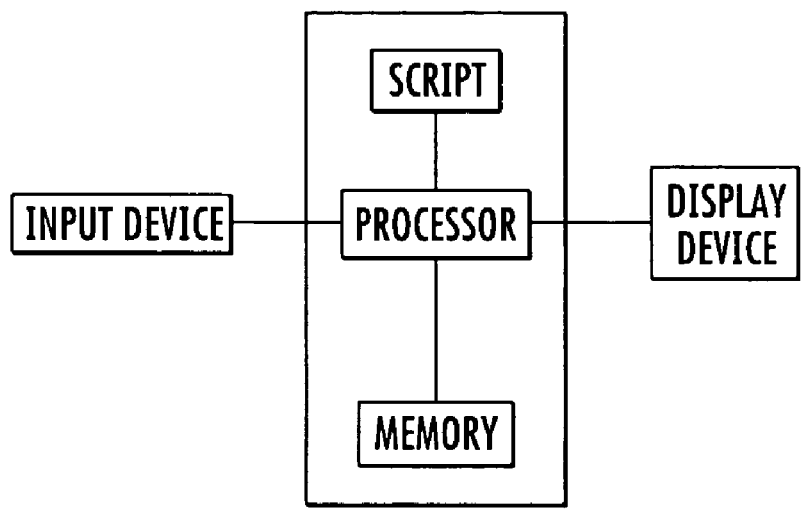
FIG. 8 is an email gateway diagnostic system of the present invention according to one embodiment of the present invention.

FIG. 8 is a schematic representation of an email gateway diagnostic system of one embodiment of the present invention. The system includes a computer system and a set of computer-readable instructions to perform automated troubleshooting. An external input device such as a keyboard or mouse is included to allow a user to enter information that is queried by the set of instructions. A display device is included to display the results of the automated troubleshooting to a user, such as depicted in FIGS. 2-7. Typically, the diagnostic tool and the computer instructions that typically comprise the tool are an application program executable by a computer as shown in FIG. 8 so as to interact with and query the email server upon execution. However, a tool, system or method of the present invention can be accomplished in other manners.

The skill and knowledge required for troubleshooting an email gateway installation and configuration are maintained by the tool and not required of the user. The tool has built-in intelligence and decision-making capabilities to automate the troubleshooting process. Because the user does not need to be confused or overwhelmed by the specific details of the troubleshooting, the tool only needs to present the resulting information or recommendations for consumption by the user. Thus, by using the email gateway diagnosis tool, system, or method of the present invention, a user can automatically troubleshoot a specific email gateway configuration without detailed knowledge of the components that make up the network, what network settings and systems to test, or how to communicate and test these network settings and systems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method of troubleshooting email gateway functionality with at least two modes of operation comprising the steps of:

determining at least one setting of an email gateway;
   accepting external information entered by an input device and related to troubleshooting the functionality of the email gateway;
   performing at least one troubleshooting routine in at least one of said modes to evaluate the email gateway functionality, wherein said at least one troubleshooting routine collects and tests at least one setting of said email gateway, and wherein said at least one troubleshooting routine includes separate collection and testing of at least one setting depending upon a reported functionality or lack thereof of said email gateway, wherein said reported functionality or lack thereof identifies whether the email gateway is receiving mail or delivering mail, and wherein said at least one troubleshooting routine includes separate collection and testing of a configuration depending upon whether the email gateway is receiving mail or delivering mail;

checking at least one setting of said email gateway based upon said external information; and displaying information resulting from said checking of at least one setting.

2. The method of troubleshooting email gateway functionality of claim 1, wherein said external information is related to at least one of receiving mail, delivering mail, the direction of mail, a server address, and a domain address.

3. The method of troubleshooting an email gateway functionality of claim 1, further comprising the step of testing at least one function of said email gateway.

4. The method of troubleshooting an email gateway functionality of claim 1, further comprising the steps of:
   determining at least one setting of a computer network interoperably connected to said email gateway; and
   checking at least one setting of said computer network based upon said external information or information resulting from said check of at least one email gateway setting.

5. A computer program product comprising a computer-useable medium having a computer-readable code embodied therein with at least two modes operation for performing a method of troubleshooting the functionality of an email gateway by a user computer, said computer readable code comprising:
   first computer-readable code configured to cause said user computer to effect determining at least one setting of said email gateway;
   second computer-readable code configured to cause said user computer to effect accepting external information entered by an input device and related to troubleshooting the functionality of said email gateway;
   third computer-readable code configured to cause said user computer to effect performing at least one troubleshooting routine in at least one of said modes to evaluate the email gateway functionality, wherein said at least one troubleshooting routine of said third computer-readable code is configured to collect and test at least one setting of said email gateway, and wherein said at least one troubleshooting routine of said third computer-readable code is configured to include separate collection and testing of at least one setting depending upon a reported functionality or lack thereof of said email gateway, wherein said reported functionality or lack thereof identifies whether the email gateway is receiving mail or delivering mail, and wherein said at least one troubleshooting routine includes separate collection and testing of a configuration depending upon whether the email gateway is receiving mail or delivering mail;
   fourth computer-readable code configured to cause said user computer to effect checking at least one setting of said email gateway based upon said external information; and fifth computer-readable code configured to cause said user computer to effect displaying at least one resulting information associated with said checking of at least one setting.

6. The computer program product of claim 5, wherein said second computer readable code is configured to cause said user computer to effect accepting external information related to at least one of receiving mail, delivering mail, the direction of mail, a server address, and a domain address.

7. The computer program product of claim 5, further comprising:
   sixth computer-readable code configured to cause said user computer to effect testing at least one function of said email gateway; and
   seventh computer-readable code configured to cause said user computer to effect displaying at least one resulting information associated with said testing of at last one function of said email gateway.

8. The computer program product of claim 7, further comprising:
   eighth computer-readable code configured to cause said user computer to effect determining at least one setting of a computer network interoperably connected to said email gateway; and
   ninth computer-readable code configured to cause said user computer to effect checking at least one setting of said computer network based upon said external information or resulting information associated with said check of at least one setting.

9. A computer system used to troubleshoot email gateway functionality comprising:
   a processor, operative to determine, accept, check, and display data;
   a memory for storing data coupled to said processor;
   a display device coupled to said processor for displaying data;
   an input device coupled to said processor for entering external data related to troubleshooting the functionality of the email gateway;
   a computer-readable script with at least two modes of operation executable by said processor, the script capable of determining at least one setting of an email gateway; accepting external data; performing at least one troubleshooting routine in at least one of said modes to evaluate the email gateway functionality, wherein said at least one troubleshooting routine of said computer-readable script is capable of collecting and testing at least one setting of said email gateway, and wherein said at least one troubleshooting routine of said third computer-readable script is capable of including separate collection and testing of at least one setting depending upon a reported functionality or lack thereof of said email gateway, wherein said reported functionality or lack thereof identifies whether the email gateway is receiving mail or delivering mail, and wherein said at least one troubleshooting routine includes separate collection and testing of a configuration depending upon whether the email gateway is receiving mail or delivering mail; checking at least one email gateway setting based upon said external data; and displaying information resulting from said check of at least one email gateway setting.

10. The computer system of claim 9, wherein said computer-readable script is further capable of testing at least one function of said email gateway.

11. The computer system of claim 9, wherein said computer-readable script is further capable of:

determining at least one setting of a computer network interoperably connected to said email gateway; and checking at least one setting of said computer network based upon said external data or said information resulting from said check of at least one email gateway setting.

12. A computer program product comprising a computer-useable medium having a computer-readable code embodied therein, the computer readable code comprising:

a script with at least two modes of operation capable of interacting with a computer system and a computer network, wherein said script includes routines in said modes and selects at least one routine in at least one of said modes to collect and test the configuration of an email gateway of said computer system and said computer network, wherein said routines collect and test the configuration of said computer system and said computer network responsible for receiving and delivering email, and wherein said routines include separate collection and testing of at least one of the configurations depending upon a reported functionality or lack thereof of the email gateway, wherein said reported functionality or lack thereof identifies whether the email gateway is receiving mail or delivering mail, and wherein said routines include separate collection and testing of a configuration depending upon whether the email gateway is receiving mail or delivering mail.

13. The computer program product of claim 12, wherein said routines include separate collection and testing of a configuration depending upon whether the email gateway is not receiving incoming or outbound mail.

14. The computer program product of claim 12, wherein said routines include separate collection and testing of a configuration depending upon whether the email gateway is not delivering incoming or outbound mail.

15. The computer program product of claim 12, wherein said script queries said computer system and said computer network for information to test the configuration of said computer system and said computer network.

16. The computer program product of claim 12, wherein said computer network is interoperably connected to a mail transport agent.

17. The computer program product of claim 16, wherein said script is written to collect and test the configuration of said mail transport agent.

18. The computer program product of claim 17, wherein said script provides feedback or possible solutions to problems based upon testing said configuration of said mail transport agent.

* * * * *